United States Patent [19]
Chihara et al.

[11] Patent Number: 5,746,867
[45] Date of Patent: May 5, 1998

[54] PROCESS FOR FILM TRANSFER RUBBER MOLDING OF GLASS RUN CHANNEL COMPOSITES AND THE PRODUCT FORMED THEREBY

[75] Inventors: Kohji Y. Chihara, Carmel; James A. Roth, Wabash; Gary A. Krotke, North Manchester, all of Ind.

[73] Assignee: GenCorp Inc., Fairlawn, Ohio

[21] Appl. No.: 724,723

[22] Filed: Sep. 30, 1996

Related U.S. Application Data

[62] Division of Ser. No. 263,299, Jun. 21, 1994, Pat. No. 5,635,274.

[51] Int. Cl.[6] .................................................. E06B 7/23
[52] U.S. Cl. .......................... 156/242; 156/245; 428/122; 428/358
[58] Field of Search .................... 428/122, 31, 358; 49/490.1; 156/242, 245

[56] References Cited

U.S. PATENT DOCUMENTS

| | | | |
|---|---|---|---|
| 3,899,378 | 8/1975 | Wragg et al. | 156/73.5 |
| 4,436,274 | 3/1984 | Kramer | 248/633 |
| 4,783,931 | 11/1988 | Kirkwood | 428/122 X |
| 4,913,976 | 4/1990 | Brooks et al. | 428/494 |
| 4,923,759 | 5/1990 | Brooks et al. | 428/521 |
| 4,937,126 | 6/1990 | Jackson | 428/122 |
| 5,013,379 | 5/1991 | Brooks et al. | 156/244.11 |
| 5,183,613 | 2/1993 | Edwards | 264/173.19 |
| 5,635,274 | 6/1997 | Chihara et al. | 428/122 |

FOREIGN PATENT DOCUMENTS

| | | |
|---|---|---|
| 2580285 | 10/1986 | France. |
| 60-165227 | 8/1985 | Japan. |
| 63-137018 | 8/1988 | Japan. |
| 63-241649 | 3/1990 | Japan. |

OTHER PUBLICATIONS

Bonding of Ultra High Molecular Weight Polyethylene to Styrene–Butadiene Rubber, Gary R. Hamed and Hasan S. Dweik, 1992, pp. 92–97.

*Primary Examiner*—Henry F. Epstein
*Attorney, Agent, or Firm*—Robert F. Rywalski; Larry R. Meenan

[57] ABSTRACT

A process for forming a glass run channel composite having a thin film of ultra high molecular weight polyethylene as a sealing contact surface and an elastomeric rubber as a substrate by film transfer rubber molding and the product formed thereby

22 Claims, 1 Drawing Sheet

PROCESS FOR FILM TRANSFER RUBBER MOLDING OF GLASS RUN CHANNEL COMPOSITES AND THE PRODUCT FORMED THEREBY

This is a divisional application Ser. No. 08/263,299 filed on Jun. 21, 1994, now U.S. Pat. No. 5,635,274 the disclosure of which is incorporated herein by reference.

FIELD OF THE INVENTION

This invention relates to a process for film transfer rubber molding of glass run channel composites and the product formed thereby. More particularly, this invention relates to a process for forming a glass run channel composite having a thin film of ultra high molecular weight polyethylene as a sealing contact surface and an elastomeric rubber as a substrate by film transfer rubber molding and the product formed thereby.

BACKGROUND OF THE INVENTION

Various elastomers such as ethylene-propylene diene terpolymer (EPDM) and styrene-butadiene copolymer have been utilized for many years in applications requiring a sealing contact between the elastomer and another object, such as in glass run channels which are positioned in the window frames of automobile doors to provide a seal between the window frame and the glass.

The elastomer utilized in glass run channel applications generally possesses excellent weatherability properties and is flexible to provide a seal of the elastomer against the window glass without the application of excessive force. Nevertheless, most suitable flexible elastomers lack the low-friction, abrasion or wear resistant properties necessary for ease of travel of window glass within the glass run channel and for long life of the glass run channel.

Accordingly, an accepted practice to provide durability and abrasion resistance to the elastomer forming the glass run channel has been to provide a flocking layer to the contact surface between the elastomer and the glass surface. However, application of the flocking layer about a corner of the glass run channel requires a flock adhesive containing volatile organic compounds and the problems associated therewith and requires a complicated and costly manual application of flocking.

One alternative to flocking of a glass run channel for improved abrasion and wear resistance is a coating such as described in U.S. Pat. Nos. 5,115,007 and 5,221,707. However, a coating as described in U.S. Pat. Nos. 5,115,007 and 5,221,707 typically includes a solvent of a volatile organic compound which necessitates careful handling and manufacturing procedures.

Glass run channels have also included a combination of a thermoplastic wear strip, for example polypropylene, that is adhered to the EPDM across the bottom of the glass run channel and flocking material that is adhered to the EPDM at the lips of the glass run channel. Although polypropylene possesses the required low friction, high abrasion resistance and high durability properties, a polypropylene wear strip is excessively rigid and must be more than 1 mm thick to provide acceptable wear performance. In addition, polypropylene wear strips have been found to melt and flow thereby generating nonuniform rough sections at the corners and spliced areas when molded with an EPDM substrate at elevated temperatures of about 350 degrees fahrenheit.

It will be appreciated that a rubber molding process is typically too hot to utilize thermoplastic films. The temperature of the mold cavities and mold core inserts must be kept high, for example 350 degrees fahrenheit or more, to cure the rubber compound. In addition, the rubber compound temperature must also be maintained low enough to prevent cure of the rubber compound before the rubber compound flows into the mold cavity. As a result, thermoplastic films typically melt on the mold cavity surfaces such that the films do not transfer to the rubber compound substrate as a smooth uniform continuous thin film.

In view of the foregoing, it is recognized that there is a significant need for an improved method of manufacturing glass run channel composites, particularly, corner glass run channel composites that overcomes the problems of the prior art. As described herein, in contrast to heretofore known methods of off-line flocking and/or coating of a glass run channel corner or on-line flocking and/or coating of a glass run channel, the present invention provides the advantages of 1) a glass run channel composite having improved performance, e.g., low friction and extremely high abrasion resistance, 2) eliminating volatile organic compounds typically present in a coating, 3) simplifying production, i.e., no coating thickness control, cure process requirements, or labor intensive procedures, 4) application of a uniform continuous film to areas previously unsuited for coating or flocking because of certain geometrical restrictions, 5) a film top surface flush with the surrounding top surface of the glass run channel substrate to provide an aesthetically pleasing appearance and a composite that is not prone to peeling or delamination, and 6) a continuous length of glass run channel having little or no seam lines when formed by joining two or more glass run channels having thin films of ultra high molecular weight polyethylene.

SUMMARY OF THE INVENTION

Briefly, according to this invention, there is provided a process for forming a molded glass run channel composite of an elastomeric rubber compound substrate having a sealing contact surface of a uniform smooth continuous thin film of ultra high molecular weight polyethylene. The molded glass run channel composite may be in the shape of a glass run channel corner or a continuous generally straight length of glass run channel. The process includes the steps of providing at least one metal mold core insert and at least one metal mold core shell. The metal mold core insert and the metal mold core shell are capable of being operatively coupled to form a mold having a cavity of a glass run channel shape and having at least one access opening to the cavity. The mold core insert is then heated to a temperature greater than 266 degrees fahrenheit. After the metal mold core insert is heated the ultra high molecular weight polyethylene thin film is pressed to a surface of the heated metal mold core insert at a pressure from 1–400 pounds per square inch for more than 2 seconds to adhere the ultra high molecular weight thin film to the insert. The metal mold core insert and the metal mold core shell are then coupled to form a mold cavity having a temperature greater than 266 degrees fahrenheit. Next, a nonpolar elastomeric rubber compound is forced into the at least one access opening of the mold cavity to form the substrate. Then the mold is opened to remove a molded glass run channel of an elastomeric rubber compound having a sealing contact surface of a uniform smooth continuous thin film of ultra high molecular weight polyethylene.

In an alternative embodiment, the mold further includes at least one aperture and preferably at least a first aperture and a second aperture. An end of each preformed glass run channel strip is placed in a portion of each aperture. The metal mold core insert and the metal mold core shell are then coupled to form a mold cavity. The molding operation as previously described is then performed such that a corner or joint of glass run channel is formed connecting one or more preformed glass run channel strips with a molded glass run channel. The molded glass run channel has a sealing contact surface of ultra high molecular weight polyethylene wherein the thin film top surface of ultra high molecular weight polyethylene is flush with the rubber substrate surrounding the top surface to provide a glass run channel composite having an aesthetically pleasing uniform surface contour and a composite that is not prone to peeling or delamination. Moreover, when joining under molten conditions two or more thin films of ultra high molecular weight polyethylene the thin films fuse together thereby becoming one continuous length of film thereby providing a glass run channel having little or no seam lines.

BRIEF DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 2:
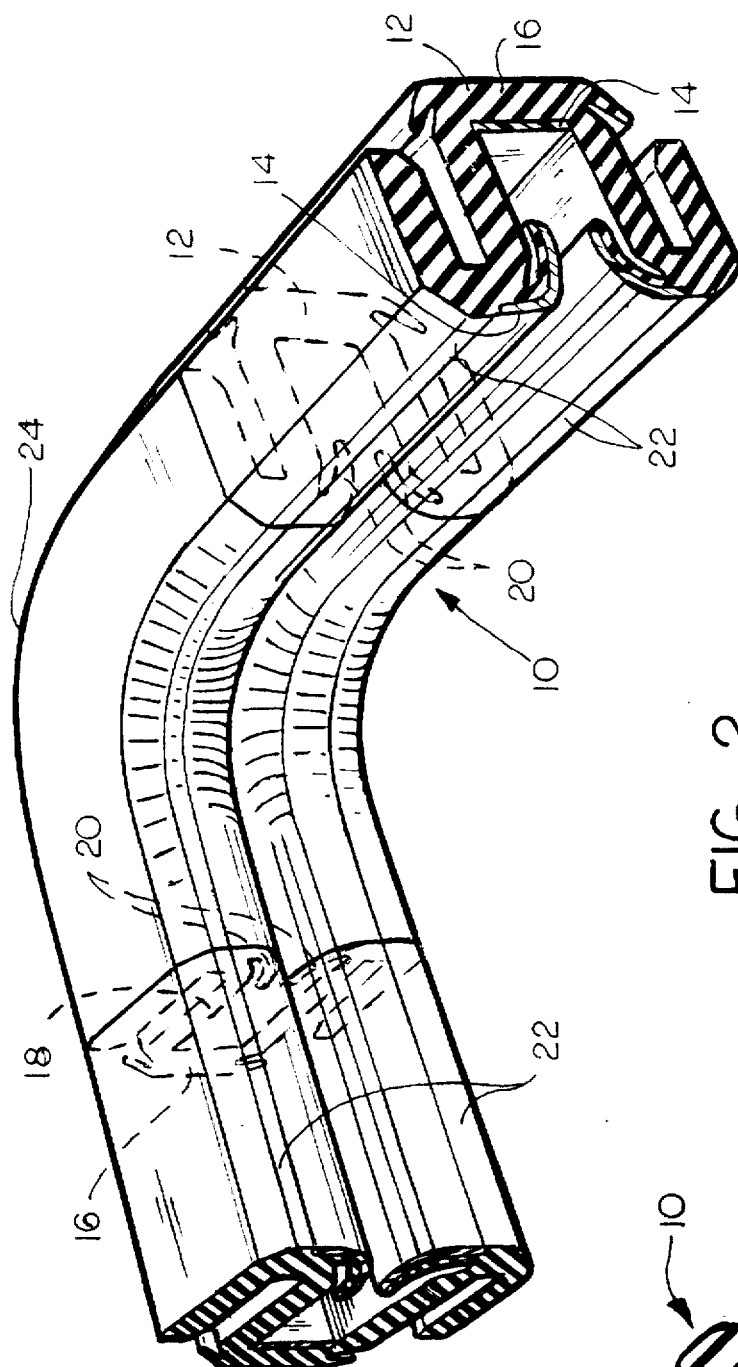
FIG. 2 is a perspective view of a molded glass run channel corner in accordance with the present invention.
Figure 1:
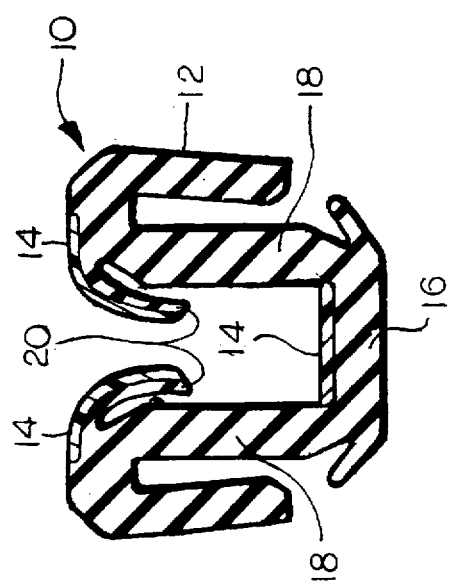
FIG. 1 is a representative sample of a cross section of one type of glass run channel having a thin film of ultra high molecular weight polyethylene.

Referring to the drawing, wherein like reference characters represent like elements, FIGS. 1 and 2 illustrate a representative example of a glass run channel 10 manufactured in accordance with the present invention. As shown in FIG. 2, the glass run channel 10 is in the shape of a glass run channel corner 24. The glass run channel 10 includes an integrally formed composite of a substrate 12 and a sealing contact surface of a thin abrasion resistant film of ultra high molecular weight polyethylene (UHMWPE) 14.

The substrate 12 of the glass run channel corner 24 generally includes a base 16, sidewalls 18 and a pair of similar inwardly extending opposed lips 20 which extend generally horizontally across a channel defined by base and sidewalls. The substrate 12 is of a shape to receive a portion of the automobile window to provide a weather resistant seal when the window engages the base 16 and spreads the lips 20 apart thereby resiliently engaging each lip of the channel.

The substrate 12 of the glass run channel corner 24 is formed of any commercially available flexible nonpolar rubber elastomer compound of a type which is well known in the art and which provides good sealing against a glass window surface without the application of excessive pressure against the glass surface. The flexible nonpolar rubber elastomer compound of which the substrate 12 is formed must also display good weatherability properties. The flexible nonpolar rubber elastomer compound formed substrate 12 may also be highly extendible with conventional additives such as carbon black and the like to maintain a reasonable price of the substrate. Desirable nonpolar rubber elastomer compounds of which the substrate 12 can be formed generally include curable or thermosetting elastomers. Desirable nonpolar rubber elastomer compounds include styrene-butadiene rubber compound, ethylene-propylene rubber compound, butyl rubber compound, neoprene rubber compound and natural rubber compound. A preferred rubber elastomer compound is ethylene-propylene terpolymer, also commonly referred to as EPDM. The EPDM substrate 12 may be cured or uncured EPDM.

In accordance with the present invention, a main feature of the composite glass run channel corner 24 is that the substrate 12 includes a uniform smooth continuous wear resistant thermoplastic film of UHMWPE 14. As an automobile window moves up and down, the window surface engages and seals against the UHMWPE film 14 and not the low wear resistant EPDM rubber compound substrate 12 thereby extending the life of the glass run channel 10 and facilitating travel of the window in the window frame. The UHMWPE film 14 is a film of uniform thickness ranging from 3 micrometer to 400 micrometer and preferably 50 to 300 micrometer. A suitable UHMWPE film is a UHMWPE film prepared by geltrusion and sold under the name Soluflex from DSM or sold under the name Unic Film from UC Plastics or a UHMWPE film prepared by skiving and sold under the name 402B from Dewal Industries Inc. The UHMWPE has a weight average molecular weight between 3,000,000 and 6,000,000. It will be appreciated that in contrast to lower molecular weight polyethylene, e.g., high molecular weight polyethylene (HMWPE) or low density polyethylene, UHMWPE has exceptional abrasion resistance, impact resistance and excellent adhesion properties to nonpolar elastomers. Consequently, UHMWPE has been found to possess the required low coefficient of friction and abrasion and impact and weather resistance required for glass run channel applications to prevent distortion of the glass run channel and provide long wear life.

In accordance with the present invention, for ease of and economy of manufacture it has been found preferable that the UHMWPE film 14 can be applied to the rubber compound substrate 12 of a corner 24 of a glass run channel by a film transfer rubber molding process. The process includes at least one metal mold core insert and at least one metal mold core shell. The insert and the shell when coupled together form a cavity having the desired shape of the glass run channel corner 24 to be formed. The mold cavity has two or more apertures to receive the ends of preformed molded glass run channel strips 22 which extend from the corner 24. The preformed glass run channel strips 22 are preferably formed by extrusion and include a thermoplastic film as described in U.S. Pat. Nos. 4,913,976; 5,013,379 and 5,183, 613 or an UHMWPE film in accordance with the present invention. The apparatuses and processes for corner molding separate from the inventive process described herein are well known in the art and will not be repeated for purposes of clarity in illustrating and describing the present invention.

The mold core insert is first heated to a temperature greater than approximately 266 degrees fahrenheit. A segment of UHMWPE film 14 is then placed on the heated inner mold insert surface. It is important that the film 14 is placed at a location on the insert corresponding to a matching location on the exterior surface of the glass run channel corner 24 to be formed. The UHMWPE film 14 may be adhered to the hot mold core metal insert by manually pressing the film to the insert with a flexible and releasable stamping head. The stamping head may be of 50 durometer silicone rubber. It has been found that the temperature of the metal insert, pressure from the stamping head and the time duration of pressing are critical to the successful practice of the invention. The temperature of the insert, applied pressure and time duration of applied pressure affect the adhesion state between the film 14 and the hot metal. The pressure must be of sufficient force and applied uniformly throughout the longitudinal extent of the film 14 to maintain the film in position atop the insert to resist the shear force from the flowing rubber compound during the rubber molding operation during which the film transfers to the rubber compound. The applied pressure must be from about 1–400 psi and preferably 50–400 psi. The applied pressure must be applied for more than 2 seconds, preferably more than 5 seconds and most preferably in the range of 5–10 seconds. The metal insert must be heated between 275–370 degrees fahrenheit, preferably 300–370 degrees fahrenheit and most preferably 330–350 degrees fahrenheit. At the required operational pressures, times and temperatures the UHMWPE film 14 becomes tacky such that the adhesion of the UHMWPE film to the heated metal insert is sufficiently strong to hold the film in position against rubber compound drag flow during molding and after molding is complete, readily transfer to the EPDM substrate 12 for which the UHMWPE has a greater affinity.

After the film 14 is adhered to the mold core insert, the ends of preformed glass run channel strips 22 are inserted into the apertures and the mold insert and shell are coupled to form a mold cavity of the desired glass run channel corner shape, for example 24, and heated to a temperature greater than 266 degrees fahrenheit. Nonpolar elastomeric material forming the substrate 12 is then forced into at opening process opening provided to the mold cavity thereby filling the mold cavity. The temperature of the rubber compound is suitably high such that it can be easily worked and forced into the cavity. The temperature of the mold cavity during rubber transfer molding of the EPDM substrate may vary from approximately 300 to 450 degrees fahrenheit depending upon rubber molding conditions, e.g., rubber flow rate into the mold. It will be appreciated that the molding temperature is such that some interdiffusion is obtained at the interface of the UHMWPE film and the EPDM rubber compound to achieve the desired adhesion level. In contrast, with regard to the metal insert, there is merely a sufficient level of pressure-sensitive adhesion and no interdiffusion, therefore the film does not bond to the mold insert to prevent transfer to the rubber compound.

The substrate 12 is forced through the access opening thereby forcing the substrate into contact with the film of UHMWPE 14 and under a sufficient constant pressure such that the substrate and film are forced together and the film readily transfers from the metal insert surface to the substrate as a smooth complete continuous film of uniform thickness. A surface of the UHMWPE film 14 which engages with the rubber compound is melted due to the high temperature of the molded rubber compound, as well as the exotherm created by the curing reaction, thereby bonding the UHMWPE film to the surrounding rubber compound substrate 12. The UHMWPE film top surface is flush with the surrounding top surface of the substrate thereby providing a glass run channel composite having an aesthetically pleasing uniform surface contour and a composite that is not prone to peeling or delamination. The molded rubber compound also is at a sufficiently high temperature to melt the surfaces of the preformed glass run channel strips 22 in contact therewith such that a bond is formed between the preformed glass run channel strips and the newly formed glass run channel corner 24 to form a continuous length of glass run channel.

Although it may appear that the principles of multi-layer thermoplastic molding are readily adaptable to film transfer rubber molding, it will be appreciated that a rubber molding process is typically too hot to utilize thermoplastic films. The temperature of the mold cavities and mold core inserts must be kept high, for example 350 degrees fahrenheit or more, to cure the rubber compound. In addition, the rubber compound temperature must also be maintained low enough to prevent cure of the rubber compound before the rubber compound flows into the mold cavity. As a result, thermoplastic films typically melt on the mold cavity surfaces such that the films do not transfer to the rubber compound substrate as a smooth continuous thin film. Accordingly, low density and high density polyethylene films, polypropylene and poly vinyl chloride films do not successfully transfer in a film transfer rubber molding process. It will be further appreciated that in previous multi-layer thermoplastic operations a variety of difficult and intricate methods were typically employed to maintain the film in position within the mold. For example, mechanical holding devices, vacuum suction devices and methods for controlling the flow of resin perpendicular to the film were used for multi-layer thermoplastic molding to maintain the film in position. However, in accordance with the present invention, at the operational pressures, times and temperatures an UHMWPE film 14 has been found to possess the required properties to film transfer mold to a rubber compound substrate without the use of complicated and difficult film constraint methods.

The glass run channel corner 24 produced in accordance with the present invention can be utilized wherever a rubber compound type gasket material having good wear resistance is desired. As shown in FIG. 1, one such use is as a wear channel for a vehicle window. Though the invention has been described and illustrated with respect to the glass run channel corner 24 of FIGS. 1 and 2 it is recognized that other glass run channel cross sectional shapes may be formed as desired. For example, the process of the present invention may also be used to form a generally straight section to join two shorter glass run channel strips 22. Moreover, when joining two or more glass run channel strips the ultra high molecular weight polyethylene film described above fuses, i.e., when the films touch each other or are pressed together under molten conditions (temperatures in excess of 275 degrees fahrenheit) the films adhere and fuse together due to interdiffusion and entanglement of the molecular chain thereby becoming one continuous length of film with little or no seam lines.

The invention will be further clarified by a consideration of the following examples which are intended to be purely exemplary of the present invention.

EXAMPLE 1

A precut film of UHMWPE sold under the name Unic Film from UC Plastics was manually placed onto the surface of a mold insert of a type well known in the art using a hand operated arbor press. The film was approximately 203 micrometer thick. The mold insert was preheated to a temperature of approximately 345 degrees fahrenheit. The pressure developed from the arbor press to apply the film to the heated mold insert was approximately 50–400 psi. Upon visual inspection it appeared that the film readily adhered to the mold insert. The mold insert was coupled with a mold core shell to form a mold cavity of the desired shape of a glass run channel corner. EPDM rubber compound was then introduced to the mold cavity to form the substrate. The composition of the EPDM rubber compound is provided below in Table 1.

TABLE 1

| EPDM Rubber Compound | Parts by Hundred Rubber (PHR) |
|---|---|
| EPDM | 100.0 |
| ZnO | 10.0 |
| Stearic Acid | 1.0 |
| Carbon Black | 137.0 |
| N-oxydiethylene-2-benzothiazyl sulfenamide | 1.0 |
| Oil | 40.0 |
| Sulfur | 2.0 |
| Bismate | 0.3 |
| Binder | 0.25 |

After cooling, the glass run channel corner was removed from the mold whereupon the glass run channel corner was visually inspected. The EPDM rubber compound clearly flowed around the film without displacing the film and the film bonded to the molded rubber compound in the proper position.

Comparative Example 1

The process of Example 1 was repeated except the pressure developed from the arbor press to apply the film to the mold insert was greater than 400 psi. Upon visual inspection of the mold insert it appeared that the film only adhered to the insert in a few locations. Further rubber transfer molding was not performed because of the poor adhesion of the film to the insert such that acceptable film transfer would not be possible.

Comparative Example 2

The process of Example 1 was repeated except the mold insert was allowed to cool to approximately 250 degrees fahrenheit. The UHMWPE film did not soften and adhere to the mold insert. Further rubber transfer molding was not performed because of unacceptable adhesion.

Comparative Example 3

The process of Example 1 was repeated except the mold insert was heated to above 380 degrees fahrenheit. The UHMWPE film did not adhere to the insert over the entire film surface. The UHMWPE film only adhered to the mold insert in spots. Further rubber transfer molding was not performed because of unacceptable adhesion.

Comparative Example 4

A precut one inch square film of polyvinylidene fluoride-acrylic polymer blend backed with a polypropylene adhesive layer and protected with a polyethylenephthalate layer sold under the name Fluorex from Rexham corporation was manually placed and pressed onto the surface of a No. 400 steel plate heated to approximately 350 degrees fahrenheit. The protective layer was not peeled off before placing the film on the steel plate such that the protective film contacted the steel plate. The film was then covered with EPDM green rubber compound and manually pressed, and then a 200 gram weight was placed on the rubber compound. The prepared steel plate was then heated in a hot air oven at 350 degrees fahrenheit for approximately 10 minutes and then removed from the oven. The EPDM rubber compound was then manually peeled off of the steel plate to observe the material condition and adhesive level. The Fluorex film did not adhere to the steel plate.

Comparative Example 5

A precut one inch square film of polyvinylidene fluoride-acrylic polymer blend backed with a polypropylene adhesive layer and protected with a polyethylenephthalate layer sold under the name Fluorex from Rexham corporation was manually placed and pressed onto the surface of a No. 400 steel plate approximately heated to 350 degrees fahrenheit. The protective layer was peeled off before placing the film on the steel plate such that the polyvinylidene fluoride-acrylic polymer blend film backed with a polypropylene adhesive layer contacted the steel plate. The material was then covered with EPDM green rubber compound and manually pressed, and then a 200 gram weight was placed on the rubber compound. The prepared steel plate was then heated in a hot air oven at 350 degrees fahrenheit for approximately 10 minutes and then removed from the oven. The EPDM rubber compound was then manually peeled off of the steel plate to observe the material condition and adhesion level. The blend layers were melted and partially remained on the steel plate and partially transferred to the EPDM.

Comparative Example 6

Approximately 0.5 grams of a crosslinkable polyethylene powder (dicumyl peroxide dispersed) sold under the name XL-35 from A. Shulman Company was manually spread over about a one inch square surface area of a No. 400 steel plate approximately heated to 350 degrees fahrenheit. The material was then covered with EPDM green rubber compound and manually pressed, and then a 200 gram weight was placed on the rubber compound. The prepared steel plate was then heated in a hot air oven at 350 degrees fahrenheit for approximately 10 minutes and then removed from the oven. The EPDM rubber compound was then manually peeled off of the steel plate to observe the material condition and adhesion level. The XL-35 powder melted and partially remained on the steel plate and partially transferred to the EPDM.

Comparative Example 7

Approximately 0.5 grams of an ultra high molecular weight polyethylene powder sold under the name Stamylan UH210 from Stam Carbon BV was manually spread over about a one inch square surface area of a No. 400 steel plate approximately heated to 350 degrees fahrenheit. The material was then covered with EPDM green rubber compound and manually pressed, and then a 200 gram weight was placed on the rubber compound. The prepared steel plate was then heated in a hot air oven at 350 degrees fahrenheit for approximately 10 minutes and then removed from the oven. The EPDM rubber compound was then manually peeled off of the steel plate to observe the material condition and adhesion level. The powder had consolidated and transferred to the EPDM such that the consolidated material had a powdery rough appearance.

Comparative Example 8

Approximately 0.5 grams of carbon black dispersed nylon-11 powder sold under the name Rilsan 783 Black Mac EC from Atochem Incorporated was manually spread over about a one inch square surface area of a No. 400 steel plate approximately heated to 350 degrees fahrenheit. The material was then covered with EPDM green rubber compound and manually pressed, and then a 200 gram weight was placed on the rubber compound. The prepared steel plate was then heated in a hot air oven at 350 degrees fahrenheit for approximately 10 minutes and then removed from the oven. The EPDM rubber compound was then manually peeled off of the steel plate to observe the material condition and adhesion level. The powder did not melt and remained in place.

It is believed that when a film or powder of the type shown in Comparative Examples 4–8 is used instead of an UHMWPE film in the film transfer rubber molding process of the present invention the material will flow with the EPDM rubber compound when forced into the mold thereby causing mold cavity contamination and/or fail to prepare a smooth surface at the corner of the glass run channel.

Example 2

Separate precut films of UHMWPE sold under the name Unic Film from UC Plastics were manually placed onto the surface of individual steel plates heated to a temperature greater than approximately 300 degrees fahrenheit and uniformly pressed together to adhere the film to the steel plate. The film was approximately 203 micrometer thick. Next, a variety of different types of rubber compounds as identified in Tables 2–5 below were manually pressed onto the UHMWPE film.

TABLE 2

| Natural Rubber Compound | Parts by Hundred Rubber (PHR) |
| --- | --- |
| Natural Rubber | 100.0 |
| Carbon Black N-339 | 25.0 |
| Naphenic oil | 7.0 |
| ZnO | 5.0 |
| Stearic acid | 1.0 |
| Polymerized 1,2-dihydro-2,2,4-trimethylquinoline | 1.0 |
| N-phenyl-N'(1,3 dimethylbutyl)-p-phenylenediamine | 1.50 |
| Naphthenic oil | 0.94 |

TABLE 3

| Styrene Butadiene Rubber Compound | Parts by Weight |
| --- | --- |
| Styrene Butadiene Rubber | 217.50 |
| Clay | 48.33 |
| ZnO | 3.50 |
| Polymerized 1,2-dihydro-2,2,4-trimethylquinoline | 2.40 |
| N-phenyl-N'(1,3 dimethylbutyl)-p-phenylenediamine | 2.40 |
| N-t-butyl-2-benzothiazyl sulfeneamide | 1.5 |
| Tetramethylthiuram monosulfide | 0.5 |
| Copper dimethyldithiocarbamate | 0.3 |
| Sulfur | 2.0 |
| CaO | 8.0 |

TABLE 4

| Neoprene Rubber Compound | Parts by Hundred Rubber (PHR) |
| --- | --- |
| Neoprene rubber | 100.0 |
| Octylated diphenylamine | 2.0 |
| N-isopropyl-N'-phenyl-p-phenylene-diamine | 1.0 |
| Wax | 2.0 |
| MgO | 4.0 |
| N-550 Carbon black | 13.2 |
| N-762 Carbon black | 15.7 |
| Dioctylazelate | 15.0 |
| Stearic Acid | 0.5 |
| ZnO | 3.27 |
| Ethylenethiourea | 0.65 |
| Tetramethyl thiuram disulfide | 0.33 |

TABLE 5

| Butyl Rubber Compound | Parts by Hundred Rubber (PHR) |
| --- | --- |
| Butyl rubber | 100.0 |
| Carbon black N445 | 30.0 |
| Carbon black N360 | 30.0 |
| Zinc stearate | 1.0 |
| Wax | 1.0 |
| Paraffinic oil | 20.0 |
| Tetramethylthiuram disulfide | 1.0 |
| 2-mercaptobenzothiazole | 0.5 |
| Sulfur | 1.5 |

Each composite was then heated in a hot air oven at approximately 400 degrees fahrenheit for 5 minutes and then removed and inspected to determine if the film transferred from the steel plate to the rubber compound and tested to ascertain the adhesion of the UHMWPE film by manually attempting to separate the UHMWPE film from the rubber compound. As shown below in Table 6, the UHMWPE film successfully transferred from the hot metal surface to the rubber compound and showed some evidence of adhesion to the rubber compound in each instance. Although the UHMWPE film separated from the neoprene rubber compound, it is believed that the adhesion level exhibited during the test may be sufficient for film transfer rubber molding of glass channel applications.

TABLE 6

| RUBBER COMPOUND | ADHESION | FILM TRANSFER |
| --- | --- | --- |
| Cured | | |
| natural rubber compound | the rubber tore | the film transferred from the metal to the rubber |
| styrene butadiene rubber compound | the rubber tore | the film transferred from the metal to the rubber |
| neoprene rubber compound | the film separated from the rubber | the film transferred from the metal to the rubber |
| butyl rubber compound | the rubber tore | the film transferred from the metal to the rubber |
| Uncured | | |
| natural rubber compound | the rubber tore | the film transferred from the metal to the rubber |
| styrene butadiene rubber compound | the rubber tore | the film transferred from the metal to the rubber |
| neoprene rubber compound | the film separated from the rubber | the film transferred from the metal to the rubber |

TABLE 6-continued

| RUBBER COMPOUND | ADHESION | FILM TRANSFER |
| --- | --- | --- |
| butyl rubber compound | the rubber tore | the film transferred from the metal to the rubber |

EXAMPLE 3

Individual pieces of precut UHMWPE film having a thickness of 127, 254 and 381 micrometer and sold under the name 402B from Dewal Industries Inc. were separately tested by manually placing each film onto the surface of a mold insert of a type well known in the art using a hand operated arbor press. The mold insert in each instance was preheated to a temperature of approximately 345 degrees fahrenheit. The pressure developed from the arbor press to apply the film to the heated mold insert was approximately 50–400 psi. Upon visual inspection it appeared that the individual pieces of film readily adhered to the mold insert in each instance. The mold insert was then coupled with a mold core shell to form a mold cavity of the desired shape of a glass run channel corner. EPDM rubber compound was then introduced to the mold cavity to form the substrate. After cooling, the glass run channel corner was removed from the mold whereupon the glass run channel corner was visually inspected. The EPDM rubber clearly flowed around the film in each instance without displacing the film and the film bonded to the molded rubber in the desired position.

The documents, patents and patent applications referred to herein are hereby incorporated by reference.

Having described presently preferred embodiments of the invention, it is to be understood that it may be otherwise embodied within the scope of the appended claims.

What is claimed is:

1. A process for forming a molded composite glass run channel of an elastomeric rubber substrate having a sealing contact surface of a continuous thin film of ultra high molecular weight polyethylene comprising the steps of:
   a) providing at least one metal mold core insert and at least one metal mold core shell, the metal mold core insert and the metal mold core shell capable of being operatively coupled to form a mold having a cavity of a glass run channel shape and having at least one access opening to the cavity and further having at least one aperture;
   b) heating at least one metal mold core insert to a temperature greater than 266 degrees fahrenheit;
   c) pressing the ultra high molecular weight thin film to a surface of the heated metal mold core insert at a pressure from 1–400 pounds per square inch for more than 2 seconds to adhere the ultra high molecular weight thin film to the insert;
   d) coupling the metal mold core insert and the metal mold core shell to form the mold cavity having a temperature greater than 266 degrees fahrenheit;
   e) forcing nonpolar elastomeric material into the at least one access opening of the mold cavity; and
   f) opening the mold to remove a molded glass run channel of an elastomeric rubber having a sealing contact surface of a continuous thin film of ultra high molecular weight polyethylene from the cavity.

2. The process of claim 1 wherein the ultra high molecular weight polyethylene is pressed at a pressure from 50–400 psi.

3. The process of claim 2 wherein the pressure is applied for more than 5 seconds.

4. The process of claim 2 wherein the pressure is applied for approximately 5–10 seconds.

5. The process of claim 1 wherein the metal insert is heated between 275–370 degrees fahrenheit.

6. The process of claim 1 wherein the metal insert is heated between 300–370 degrees fahrenheit.

7. The process of claim 1 wherein the metal insert is heated between 330–350 degrees fahrenheit.

8. The process of claim 1 further comprising the steps of:
   a) providing at least one preformed glass run channel strip;
   b) placing an end of the at least one preformed glass run channel strip in the at least one aperture and then;
   c) coupling the metal mold core insert and the metal mold core shell to form a mold cavity.

9. The process of claim 8 wherein at least one of the preformed glass run channel strips includes a sealing contact surface of a continuous thin film of ultra high molecular weight polyethylene such that the ultra high molecular weight polyethylene film of the strip and the ultra high molecular weight polyethylene film of the molded glass run channel fuse to form one continuous length of film with little or no seam lines.

10. The process of claim 8 wherein the ultra high molecular weight polyethylene is pressed at a pressure from 50–400 psi.

11. The process of claim 10 wherein the pressure is applied for more than 5 seconds.

12. The process of claim 10 wherein the pressure is applied for approximately 5–10 seconds.

13. The process of claim 8 wherein the metal insert is heated between 275–370 degrees fahrenheit.

14. The process of claim 1 further comprising the steps of:
   a) providing at least one preformed glass run channel strip; and
   b) placing an end of the at least one preformed glass run channel strip in the mold cavity.

15. A process for forming a molded glass run channel composite of an elastomeric rubber substrate having a sealing contact surface of a continuous thin film of ultra high molecular weight polyethylene comprising the steps of:
   a) providing at least one metal mold core insert and at least one metal mold core shell, the metal mold core insert and the metal mold core shell capable of being operatively coupled to form a mold having a cavity of a glass run channel shape, a first aperture and a second aperture and having at least one access opening to the cavity;
   b) heating at least one metal mold core insert to a temperature greater than 266 degrees fahrenheit;
   c) pressing the ultra high molecular weight thin film to a surface of the heated metal mold core insert at a pressure from 1–400 pounds per square inch for more than 2 seconds to adhere the ultra high molecular weight thin film to the insert;
   d) providing at least a first preformed glass run channel strip and at least a second preformed glass run channel strip;
   e) placing an end of the first preformed glass run channel strip in a portion of the first aperture and an end of the second preformed glass run channel strip in a portion of the second aperture;
   f) coupling the metal mold core insert and the metal mold core shell to form a cavity having a temperature greater than 266 degrees fahrenheit wherein the first preformed glass run channel strip and the second preformed glass run channel strip are in communication with the cavity;

g) forcing nonpolar elastomeric rubber into the at least one access opening of the cavity; and h) opening the mold to remove a molded glass run channel of an elastomeric rubber having a sealing contact surface of a continuous thin film of ultra high molecular weight polyethylene, wherein the molded glass run channel joins the ends of the first preformed glass run channel strip and the second preformed glass run channel strip.

16. The process of claim 15 wherein the molded glass run channel is in the shape of a corner molded glass run channel.

17. The process of claim 16 wherein the ultra high molecular weight polyethylene is pressed at a pressure from 50–400 psi.

18. The process of claim 17 wherein the pressure is applied for approximately 5–10 seconds.

19. The process of claim 17 wherein the metal insert is heated between 275–370 degrees fahrenheit.

20. The process of claim 17 wherein the metal insert is heated between 330–350 degrees fahrenheit.

21. The process of claim 15 wherein at least one of the preformed glass run channel strips include a sealing contact surface of a continuous thin film of ultra high molecular weight polyethylene such that the ultra high molecular weight polyethylene film of the strip and the ultra high molecular weight polyethylene film of the molded glass run channel fuse to form one continuous length of film with little or no seam lines.

22. A process for forming a molded composite glass run channel of an elastomeric rubber substrate having a sealing contact surface of a continuous thin film of ultra high molecular weight polyethylene comprising the steps of:

a) providing at least one metal mold core insert and at least one metal mold core shell, the metal mold core insert and the metal mold core shell capable of being operatively coupled to form a mold having a cavity of a glass run channel shape;

b) heating at least one metal mold core insert;

c) pressing the ultra high molecular weight thin film to a surface of the heated metal mold core insert wherein the temperature of the insert, applied pressure and time duration of applied pressure affect adherence of the ultra high molecular weight thin film to the heated metal mold core insert;

d) coupling the metal mold core insert and the metal mold core shell to form the mold cavity;

e) forcing nonpolar elastomeric material into the mold cavity; and f) opening the mold to remove from the mold cavity a molded glass run channel of an elastomeric material having a sealing contact surface of a continuous thin film of ultra high molecular weight polyethylene.

* * * * *